United States Patent
Cao et al.

(10) Patent No.: US 9,232,810 B2
(45) Date of Patent: Jan. 12, 2016

(54) CHEWABLE SOFT CAPSULE SHELL AND CHEWABLE SOFT CAPSULE

(75) Inventors: Cuifeng Cao, Zhejiang (CN); Xuesi Zhu, Zhejiang (CN); Weiwei Wang, Zhejiang (CN)

(73) Assignees: HANGZHOU YANGSHENGTANG HEALTHCARE PRODUCTS CO., LTD., Zhejiang (CN); HAINAN YANGSHENGTANG PHARMACEUTICAL CO., LTD., Hainan (CN); NATURAL MEDICINE INSTITUTE OF ZHEJIANG YANGSHENGTANG CO., LTD., Zhejiang (CN)

( * ) Notice: Subject to any disclaimer, the term of this patent is extended or adjusted under 35 U.S.C. 154(b) by 0 days.

(21) Appl. No.: 14/124,550

(22) PCT Filed: Aug. 7, 2012

(86) PCT No.: PCT/CN2012/079765
§ 371 (c)(1),
(2), (4) Date: Dec. 6, 2013

(87) PCT Pub. No.: WO2012/167757
PCT Pub. Date: Dec. 13, 2012

(65) Prior Publication Data
US 2014/0112982 A1    Apr. 24, 2014

(30) Foreign Application Priority Data
Jun. 10, 2011  (CN) .......................... 2011 1 0154687

(51) Int. Cl.
A23G 3/34    (2006.01)
A23G 3/36    (2006.01)
(Continued)

(52) U.S. Cl.
CPC ................ *A23G 3/545* (2013.01); *A23G 3/004* (2013.01); *A23G 3/36* (2013.01); *A23G 3/44* (2013.01); *A23G 3/54* (2013.01); *A23L 1/0029* (2013.01); *A23L 1/05625* (2013.01); *A23L 1/305* (2013.01)

(58) Field of Classification Search
CPC ......... A23G 3/545; A23G 3/004; A23G 3/36; A23G 3/44; A23G 3/54; A23L 1/305; A23L 1/0029; A23L 1/05625; A61K 9/0056; A61K 9/48; A61K 9/4825; A61K 9/4833; A61K 47/48938; A61K 49/0414; A61K 49/0476; A61K 51/1262
See application file for complete search history.

(56) References Cited

U.S. PATENT DOCUMENTS 4,935,243 A * 6/1990 Borkan et al. ................ 424/441
6,258,380 B1   7/2001 Overholt
(Continued)

FOREIGN PATENT DOCUMENTS

| CN | 1164816 | 11/1997 |
| CN | 1829449 | 9/2006 |

(Continued)

OTHER PUBLICATIONS

Chinese Office Action dated Oct. 8, 2014 for Appln. No. 201110154687.0.
(Continued)

*Primary Examiner* — Aradhana Sasan
(74) *Attorney, Agent, or Firm* — Pillsbury Winthrop Shaw Pittman, LLP (57) ABSTRACT

The present invention relates to a chewable soft capsule shell and a chewable soft capsule, and to a filled jelly sweet and a process for preparing a chewable soft capsule shell or filled jelly sweet, wherein the chewable soft capsule shell comprises gelatin 10%-50%, water retention agent 10%-40%, thickening agent 2%-20%, water 6%-20%, and said soft capsule shell has a thickness of 0.3-1.2 mm.

21 Claims, 2 Drawing Sheets

(51) Int. Cl.
*A23G 3/44* (2006.01)
*A23G 3/54* (2006.01)
*A23L 1/00* (2006.01)
*A23L 1/0562* (2006.01)
*A23L 1/305* (2006.01)

(56) References Cited

U.S. PATENT DOCUMENTS

2003/0232076 A1* 12/2003 Makino et al. ............... 424/456
2005/0136104 A1   6/2005 Rowe et al.
2006/0240094 A1  10/2006 Asano et al.
2010/0055174 A1   3/2010 Xie et al.
2010/0092548 A1   4/2010 Xie et al.

FOREIGN PATENT DOCUMENTS

| | | | | |
|---|---|---|---|---|
| CN | 101283726 | 10/2008 | | |
| CN | 101444300 | 6/2009 | | |
| CN | 101590027 | 12/2009 | | |
| CN | 10178557 | 7/2010 | | |
| CN | 101785557 | 7/2010 | | |
| CN | 101785557 A | * 7/2010 | ................ | A23L 1/29 |
| CN | 101810336 | 8/2010 | | |
| CN | 101810336 A | * 8/2010 | ................ | A23L 1/29 |
| CN | 102283779 | 12/2011 | | |
| CN | 101810336 B | 3/2012 | | |
| EP | 0 374 359 | 6/1990 | | |
| JP | 08-511795 | 12/1996 | | |
| JP | 2004-10546 | 1/2004 | | |
| JP | 2007-514793 | 6/2007 | | |
| JP | 2007-525413 | 9/2007 | | |

OTHER PUBLICATIONS

International Search Report for PCT/CN2012/079765.
Taiwanese Office Action dated Jan. 23, 2014.
Yang Na et al.; "The application of coagulants in the jelly sweets processes", Food Research and Development, Jul. 2008, vol. 29, No. 7, pp. 153-156.
Australian Office Action dated Apr. 1, 2015 for Appln. No. 2012266965.
Extended European Search Report dated Apr. 16, 2015 for Appln. No. 12797302.
Japanese Office Action dated Sep. 1, 2015 for Appln. No. 2014-513904.

* cited by examiner

CHEWABLE SOFT CAPSULE SHELL AND CHEWABLE SOFT CAPSULE

CROSS-REFERENCE TO RELATED APPLICATIONS

This is the U.S. National Stage of PCT/CN2012/079765, filed Aug. 7, 2012, which in turn claims priority to Chinese Patent Application No. 201110154687.0, filed Jun. 10, 2011, the entire contents of all applications are incorporated herein by reference in their entireties.

TECHNICAL FIELD

The present invention pertains to the field of food or pharmaceutics, and relates to a chewable soft capsule shell and a chewable soft capsule. The present invention further relates to a filled jelly sweet, and a method for preparing said chewable soft capsule or said filled jelly sweet.

BACKGROUND ART

In comparison with common swallowable soft capsules in industries of food or pharmaceutics, chewable soft capsules (chewing type soft capsules) have improved chewiness of capsule shell so that they can be bitten and chewed in mouth, and have no poor taste of contents in common soft capsules.

At present, some chewable soft capsules and methods for preparing the same have been reported. For example, The patent application CN101590027A discloses a chewable soft capsule and a method for making the same, in which a sweetener layer is formed at the outside of soft capsule shell by crystallization so that the sweetener layer felt by mouth hides the taste of raw materials of capsule shell during administration. The patent application US20050136104 discloses a chewable soft capsule, in which a relatively high water content is maintained to provide the capsule with a certain softness, in which the water content of capsule shell is up to 27%. Chinese patent ZL200480021784.0 discloses a chewable capsule and a method for making the same, in which a part of crystal precipitating agent is exposed on the surface of shell as a crystal to enhance the cooling feeling in eating and to reduce the adhesion between capsules. In addition, some soft capsule products in market have an increased plasticizer proportion to get softer capsule shell.

Although the above soft capsules in the prior art have solved some problems, still there are many aspects to be further improved: (1) the chewiness of capsule shell is unsatisfactory and the stability is poor. Although the softness and chewiness of capsule shell can be improved by increasing plasticizer content or maintaining a relatively high water content, like those in US20050136104, soft capsules may be out of shape or adhered because of extrusion between each other thereby shortened the shelf-life thereof; (2) common soft capsules are not chewable after cracking, and in order to avoid reaction between liquid hydrophilic substance and capsule skin, the content is usually a liquid or suspended oil phase or filed with drug, while the poor odor of drug and greasy taste of oil and fat render the capsule can hardly be swallowed.

Figure 1:
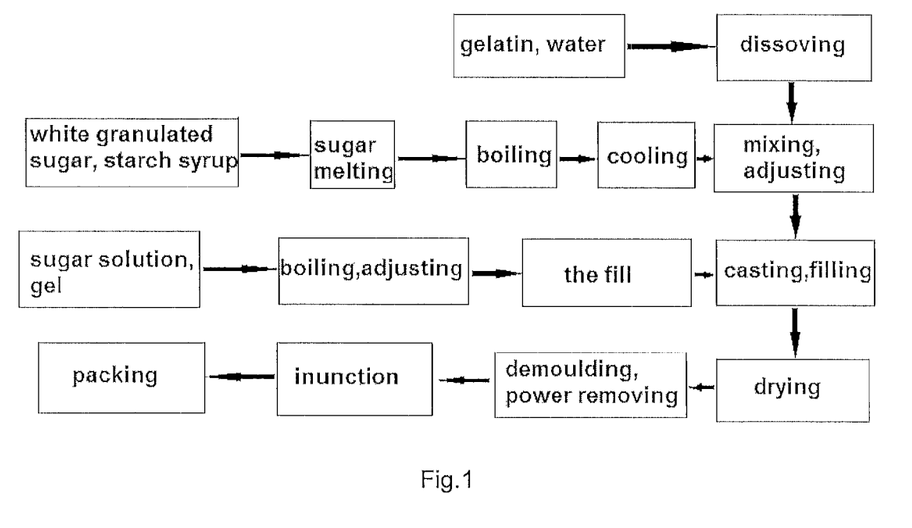
FIG. 1: a schematic diagram of a process for preparing a filled jelly sweet in the art.

Filled jelly sweets are favorite products for many consumers. At present, filled jelly sweets (sandwich type gel sweets) are prepared by a process (for example, as shown in FIG. 1) shown as follows: (1) swelling gelatin with water, then heating to dissolve gelatin to form a gelatin solution which is maintained at 60-65° C. for standby use; (2) heating white granulated sugar, glucose syrup and water for dissolution, then boiling to reach a certain sugar degree, mixing with the gelatin solution (adjusting acidity, color and taste), casting and adding contents.

However, the existing production processes are complicated, and during the process, the sweet shell should have a thickness sufficient for uniformly encapsulating the contents, and the sweet body casting temperature determines and limits the material properties of the contents and the proportion of filled content, otherwise, series problems such as syrup explosion, decentration, leakage may occur, so that the fill should be hydrophilic materials, and the content of the fill of the product would be merely 8-15%. Since the thickness of the shell of filled jelly sweet is usually far greater than 2 mm, the mouth feel of product is also limited. In addition, due to the limitations of device, process conditions on the fill system, the taste can be modified merely by regulating flavors so that the filled products are lack of innovation.

CONTENTS OF THE INVENTION

The inventors obtained a soft capsule shell of new formulation via inventive work and a lot of experiments, and surprisingly found that the soft capsule shell has good chewiness and taste, as well as good stability. The inventors also surprisingly found that the soft capsule shell was suitable for a fill in liquid, fluid, semi-solid or paste form that contains drug or food ingredient, especially suitable for a fill in semi-solid or paste form. Hence, the following invention is provided:

One aspect of the present invention relates to a chewable soft capsule shell, comprising:

| | |
|---|---|
| gelatin | 10%-50% |
| water retention agent | 10%-40% |
| thickening agent | 2%-20% |
| water | 6%-20%. |

The soft capsule shell according to any one of items of the present invention, comprising:

| | |
|---|---|
| gelatin | 12%-40% |
| water retention agent | 10%-30% |
| thickening agent | 2%-15% |
| water | 6%-18%; |

Preferably, said soft capsule shell comprising:

| | |
|---|---|
| gelatin | 15%-40% |
| water retention agent | 10%-25% |
| thickening agent | 3%-12% |
| water | 6%-18%; |

More preferably, said soft capsule shell comprising:

| | |
|---|---|
| gelatin | 15%-30% |
| water retention agent | 10%-20% |
| thickening agent | 5%-10% |
| water | 6%-16%. |

The soft capsule shell according to any one of items of the present invention has a thickness of 0.3-1.2 mm; preferably, 0.4-1.0 mm; more preferably, 0.6-0.8 mm (for example 0.6, 0.65, 0.7, 0.75, or 0.8 mm).

Without being bound by theory, when the thickness of soft capsule shell is less than 0.3 mm, the compressional deformation and leakage of content may occur. However, if the thickness is greater than 1.2 mm, the chewiness is poor, and the greater the thickness, the worse the chewiness. In addition, the mouth feel becomes worse when the thickness is greater 1.2 mm or less than 0.3 mm.

The soft capsule shell according to any one of items of the present invention, characterized in one or more of the following items (1) to (4):

(1) said gelatin is one or two selected from the group consisting of gelatins of bovine bone, pig skin, and fish skin;

(2) said gelatin has a gel strength of 80-250 Bloom; preferably 100-220 Bloom; more preferably 100-200 Bloom;

(3) said water retention agent is glycerol; optionally, further comprises one or more selected from the group consisting of sorbitol, polydextrose, and maltitol;

(4) said thickening agent is starch (preferably modified starch, and more preferably esterified starch, such as acetic acid esterified potato starch); optionally, further comprises one or more selected from the group consisting of pectin, gellan gum, agar, xanthan gum, pullulan, carrageenan, guar gum, locust bean gum, sodium alginate, and tamarind gum.

The soft capsule shell according to any one of items of the present invention, further comprising:

| | |
|---|---|
| sweetening agent | 9%-27%; |
| preferably, comprising sweetening agent | 12%-20%. |

The soft capsule shell according to any one of items of the present invention, in which said sweetening agent is one or more selected from the group consisting of white granulated sugar, glucose syrup, sucralose, trehalose, aspartame, and sugar alcohol; specifically, said sugar alcohol is one or more selected from the group consisting of xylitol, maltitol, erythritol, sorbitol, and isomaltulose Another aspect of the present invention relates to a chewable soft capsule, which comprises a fill and the chewable soft capsule shell according to any one of items of the present invention that externally encapsulates the fill.

The chewable soft capsule according to any one of items of the present invention, wherein said fill is food or drug; specifically, food or drug suitable for forming a capsule.

The external diameter of the soft capsule is a common external diameter in the art.

Further another aspect of the present invention relates to a filled jelly sweet, which comprises a fill and a sweet shell that externally encapsulates the fill, in which said sweet shell is the chewable soft capsule shell according to any one of items of the present invention.

The filled jelly sweet according to any one of items of the present invention are characterized in one or more of the following items (1) to (5):

(1) said fill is a semi-solid or in a paste form;

(2) the content of said fill in the filled jelly sweet is 15%-85%, 20%-85%, 25%-85%, 30%-85%, 35%-85%, 40%-85%, 45%-85%, 50%-80%, 55%-85%, 55%-80%, 60%-85%, 60%-80%, 15%-65%, 20%-65%, 25%-65%, 30%-65%, 35%-65%, 40%-65%, 45%-65%, or 55%-65% (for example 55%, 60%, or 65%);

(3) said fill contains nutrient substance, and said nutrient substance is one or more selected from the group consisting of vitamins, minerals, amino acids, proteins, fatty acids, new resource food raw materials, animal extracts and plant extracts that are allowed to be added into the sweet according to national laws and regulations;

(4) said filled jelly sweet has a weight loss of 520% on drying;

(5) said filled jelly sweet has a reducing sugar content of ≥10% expressed in glucose.

In the above item (3), said vitamins include but are not limited to vitamin C, vitamin B group, biotin, vitamin A, vitamin D, vitamin E, etc.

said minerals include macro- and micro-elements, such as calcium, phosphor, potassium, magnesium, iron, zinc, etc.

Said new resource food raw materials is exemplified with milk mineral salts, lutein esters, fish oils and extracts thereof, inulin, fructo-oligosaccharide, DHA algae oils, etc.

said plant extracts can be blueberry extract, cranberry extract, cherry plum extract, acerola cherry extract, etc.

said animal extracts can be collagen, bovine coloctrum, etc.

In addition, besides the above ingredients, optionally, the filled jelly sweet of the present invention can further comprise food additives such as coloring agent, flavoring agent, emulsifier, or edible essence and fragrance, etc.

The filled jelly sweet of the present invention has a fill content significantly higher than that of the existing filled jelly sweets, has good chewiness and mouth feel, and hardly has problems such as syrup explosion, decentration, leakage, etc. Furthermore, the thickness of the sweet shell (soft capsule shell) is significantly reduced.

Figure 2:
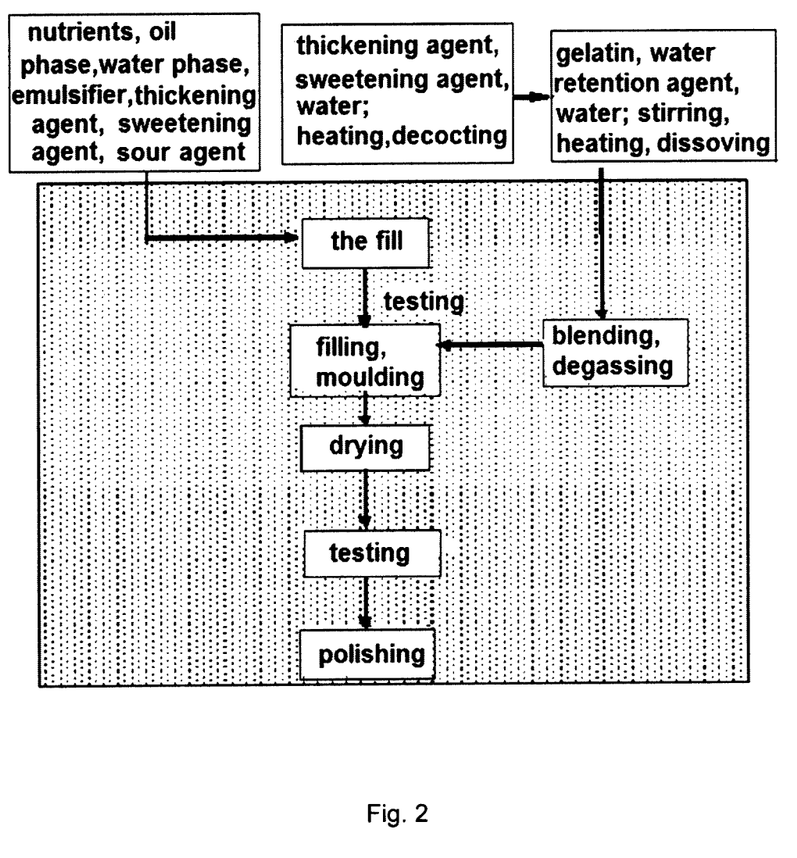
FIG. 2: a schematic diagram of a process of the present invention, in which  represents 100,000 grade clean area.

The further aspect of the present invention relates to a process for preparing the chewable soft capsule or the filled jelly sweet (as shown in FIG. 2), comprising the following steps:

1) dissolving gelatin: adding water into a tank for dissolving gelatin, elevating the temperature to 70° C.-80° C. and then adding gelatin, water retention agent, stirring until the gelatin is fully dissolved to obtain a transparent solution A;

2) decocting sugar: dissolving optional sweetening agent, optional water retention agent, thickening agent with water, then heating and decocting to reach a solid content of up to 70-80 Brix (such as 75-80 Brix), then stopping heating to obtain a substance B;

3) blending: mixing the transparent solution A and the substance B, stirring homogeneously then vacuum degassing to obtain a mixture gum solution, the temperature of the mixture gum solution being 55° C.-65° C.;

4) allowing the mixture gum solution obtained in step 3) to flow into a gum box, then flow from the gum box to a rubber wheel under the gum box, regulating to form a gum film with uniform thickness;

5) filling and molding: filling a formulated fill into the gum film obtained in step 4) and compression moulding to obtain a chewable soft capsule product or filled jelly sweets;

6) drying: placing the product obtained in step 5) into a rotating cage for shaping, then drying under conditions at 20° C.-30° C. and a relative humidity of 15%-40% until water content ≤5.20%. Specifically, the drying can be carried out in a closed or non-closed drying chamber or using recirculating air dehumidification system.

Wherein, the chewable soft capsule shell or the filled jelly sweet shell of the present invention can be prepared according to steps 1) to 4).

The preparation process according to any items of the present invention is characterized in any one or more of the following items (1) to (3):

(1) in step 1), the obtained transparent solution A is kept at 60° C.-65° C. for standby use;

(2) in step 2), the obtained substance B is kept at 80° C.-90° C. for standby use;

(3) in step 3), the obtained mixture gum solution stands for 1-3 hours.

In the process for preparing the filled jelly sweet according to any one of items of the present invention, in step 2), the solid content as measured by saccharimeter is up to 70-80 Brix.

In the preparation process, the water retention agent, thickening agent, sweetening agent, etc. can be chosen according to the description about the filled jelly sweet in the present invention, wherein the water is a water meeting the national standards on drinking water.

In one embodiment of the present invention, the water retention agent in step 1) is glycerol, and the water retention agent in step 2) is sorbitol.

Those skilled in the art well know that sorbitol also acts as sweetening agent. In the present invention, sorbitol solely can be used as water retention agent or sweetening agent, or can be used as water retention agent and sweetening agent at the same time. All of these fall into the protection scope of the present invention.

In the present invention, the semi-solid or jam (paste) fill can be prepared by a method in the art, or by the following steps:

(1) dissolving sweetening agent, sour agent, water-soluble nutritional ingredient with water (optionally, heating so as to fully dissolve), then adding with surfactant and optional water-soluble essence and/or natural pigment;

(2) adding liposoluble nutritional ingredient into oil, stirring and adding with emulsifier and thickening agent until mixing homogeneously, if the used essence is soluble in oil, it should be added in this step;

(3) processing the substances obtained in the preceding two steps with a homogenizing emulsifying device (such as colloid mill) to form a homogeneous semi-fluid or paste, then cooling to room temperature for standby use.

In the present invention, the term "chewable" has conventional meaning in the food or pharmaceutics industries, that is, the filled jelly sweet can be broken by chewing and easy for swallowing.

The term "semi-solid" has conventional meaning in the food or pharmaceutics industries, and refers to a viscous fluid substance having properties between solid and fluid at room temperature.

The term "paste" (or jam) has conventional meaning in the food or pharmaceutics industries, and refers to a paste substance having a certain fluidity and viscosity at room temperature. Examples thereof can be fruit jam, butter, etc.

BENEFICIAL EFFECTS OF THE INVENTION

The soft capsule shell of the present invention has good chewiness and stability and is not prone to problems such as decentration, leakage and so on (especially under conditions of high content fill), so that both mouth feel and toughness are achieved. In addition, based on the technique of the novel soft capsule shell of the present invention, the filled substance (the fill) is improved to form a jam that is completely different from the sweet shell, so that there are hierarchies in term of mouth feel between internal and external parts of the product, the poured fill content is elevated, the problems such as decentration, leakage and so on are not easy to occur, and the stability of sweet can be easy to achieve.

SPECIFIC MODELS FOR CARRYING OUT THE INVENTION

The embodiments of the present invention are described in details in conjunction with examples as follows, but those skilled in the art would understand that the following examples are merely used to illustrate the invention, rather than to limit the scope of the present invention. All specific technical means or conditions not given in the examples are carried out according to the technical means or conditions as described in the art or the product specifications. The used reagents or instruments of which the manufacturers are not given are all conventional products commercially available.

EXAMPLE 1

Preparation of Chewable Soft Capsule Shell 1) 36 kg of 180 Bloom pig skin gelatin, 28 kg of glycerol were added with 36 kg of water, then heated and dissolved to from a gelatin solution, which was kept at 60° C. for standby use;

2) 15 kg of white granulated sugar, 30 kg of sorbitol solution, 16 kg of modified starch were added with 32 kg of water, dissolved, then heated and decocted until a sugar solution having a solid content of 76Brix as measured with saccharimeter was obtained, which was kept at 80° C.-90° C. for standby use;

3) the gelatin solution obtained in 1) and the sugar solution obtained in 2) were mixed homogeneously and vacuum degassed to obtain a mixture gum solution, which was kept at 55° C.-65° C. and stood for 1-3 hours for standby use;

4) the mixture gum solution obtained in step 3) flowed via a gum pipe into a gum box, then flowed from the gum box to a rubber wheel under the gum box, and regulate to form a gum film with a uniform thickness required by the process.

EXAMPLE 2

Preparation of Chewable Soft Capsule Sample 1

1) 18 kg of white granulated sugar, 1.2 kg of citric acid, 0.02 kg of sucralose, 0.5 kg of blueberry extract were added with water until fully dissolved, then added with blueberry essence and stirred homogeneously;

2) 10 g of liposoluble vitamin A, 0.05 g of VD3 were added to 57 kg of corn oil, stirred and added with 2.5 kg of modified starch until blended homogeneously;

3) the substances as obtained in the preceding two steps were processed with a homogenizing emulsifying device (such as colloid mill) to obtain a semi-fluid or jam, then cooled to room temperature for standby use;

4) the semi-fluid or jam obtained in 3) was filled into the gum film obtained in Example 1, the gum film was regulated to have a thickness of 0.9 mm as required by the process and an amount of the fill of 60%, and then compression moulded, and dried.

EXAMPLE 3

Preparation of Chewable Soft Capsule Sample 2

1) 18 kg of white granulated sugar, 1.2 kg of citric acid, 0.02 kg of sucralose, 0.5 kg of blueberry extract were added with water until fully dissolved, then added with blueberry essence and stirred homogeneously;

2) 0.1 kg of liposoluble new resource food lutein ester was added to 57 kg of corn oil, stirred and added with 2.5 kg of modified starch until blended homogeneously;

3) the substances as obtained in the preceding two steps were processed with a homogenizing emulsifying device (such as colloid mill) to obtain a semi-fluid or jam, then cooled to room temperature for standby use;

4) the semi-fluid or jam obtained in 3) was filled into the gum film obtained in Example 1, the gum film was regulated to have a thickness of 0.8 mm as required by the process and an amount of the fill of 65%, and then compression moulded, and dried.

EXAMPLE 4

Confirmatory Test of Chewiness of Soft Capsule Shell

The above obtained soft capsule samples were subjected to organoleptic evaluation tests. In the organoleptic evaluation tests, 20 investigators tasted each sample and carried out investigation in three terms, chewiness of the soft capsule shell, unpleasant feel of the fill and total administration feel, via scoring method according to the criteria in the following Table 1.

TABLE 1

Criteria for organoleptic evaluation of chewable soft capsules (5 degrees)

| Item | Criterion | Score for the Corresponding Degree |
| --- | --- | --- |
| Chewiness of soft capsule shell | Very bad (tough or non-chewable) | 1 |
| Total administration feel | Poor | 2 |
| | Moderate | 3 |
| | Good | 4 |
| | Excellent (soft and comfortable) | 5 |
| Unpleasant feel of fill | Existing | 1 |
| | A little | 2 |
| | Noncommittal | 3 |
| | Hardly feeling | 4 |
| | None | 5 |

The results of the organoleptic evaluation tests are expressed in average values of scores for each sample as given by the 20 investigators and shown in Table 2, in which the comparison sample 1 (the fill contains vitamin A, D) and the comparison sample 2 (the fill contains lutein) are soft capsules of the same kind commercially available.

TABLE 2

Results of the organoleptic evaluation tests for chewable soft capsules

| | Item of organoleptic investigation test | | |
| --- | --- | --- | --- |
| Sample | Chewiness of soft capsule shell | Unpleasant feel of fill | Total administration feel |
| Comparison sample 1 | 1.3 | 1.2 | 1.2 |
| Comparison sample 2 | 3.2 | 1.4 | 2.2 |
| Example 2 | 4.3 | 4.4 | 4.4 |
| Example 3 | 4.5 | 4.7 | 4.5 |

The fills of the comparison sample 1 and the comparison sample 2 in the prior art are suspension, the unpleasant feel of fill was enhanced by greasy feel and bad smell of raw materials per se that quickly dispersed in mouth during chewing, and the total administration feel was poor, while the samples as prepared in Examples 2 and 3 showed good results in all three moderate items.

EXAMPLE 5

Preparation of Filled Jelly Sweets Sample 1

In this example, the high content fill of filled jelly sweets was an emulsified paste containing DHA and blueberry anthocyanin as nutritional ingredients.

30 kg of drinking water was added into a gelatin dissolving tank, heated to 70° C.-80° C., then 20 kg of bovine bone gelatin with a gel strength of 180 Bloom, 12 kg of pig skin gelatin of 100 Bloom and 20 kg of glycerol were added, stirred until the gelatin was fully dissolved to obtain a transparent solution A; separately, 20 kg of xylitol, 30 kg of sorbitol solution, 0.2 kg of pectin, 15 kg of modified starch were dissolved with water, then heated and decocted until a substance B having a solid content of 75Brix as measured with saccharimeter was obtained; the substances A and B were mixed homogeneously then vacuum degassed, and kept at a temperature of 55° C.-65° C.; the above paste fill was added into a hopper, the thickness of sweet shell was regulated as 1.0 mm and the amount of fill to be filled was regulated as 55%, and the filling and moulding were carried after these requirements were met, then drying and following polishing as well as packaging were carried out. The problems such as decentration and leakage did not occur during the preparation process.

Wherein, the paste fill was prepared as follows:

16 kg of white granulated sugar, 2 kg of vitamin C, 0.5 kg of blueberry extract, and 0.03 kg of sucralose were fully dissolved with water, then blueberry essence was added and stirred homogeneously; 0.1 kg of liposoluble vitamin E was added to 57 kg of fish oil, stirred and added with 1.8 kg of modified starch until blended homogeneously; the substances obtained in the above two steps were processed with a homogenizing emulsifying device (such as colloid mill) to form a homogeneous paste, which was cooled to room temperature to obtain the paste fill.

EXAMPLE 6

Preparation of Filled Jelly Sweets Sample 2

In this example, the high content fill of filled jelly sweets was a semi-solid fill containing vitamin B group as nutritional ingredients.

30 kg of drinking water was added into a gelatin dissolving tank, heated to 70° C.-80° C., then 24 kg of pig skin gelatin with a gel strength of 150 Bloom, 10 kg of fish skin gelatin of 100 Bloom and 25 kg of glycerol were added, stirred until the gelatin was fully dissolved to obtain a transparent solution A; separately, 25 kg of trehalose, 20 kg of sorbitol solution, 0.3 kg of agar, 18 kg of modified starch were dissolved with water, then heated and decocted until a substance B having a solid content of 74Brix as measured with saccharimeter was obtained; the substances A and B were mixed homogeneously then vacuum degassed, and kept at a temperature of 55° C.-58° C.; the above semi-solid fill was added into a hopper, the thickness of sweet shell was regulated as 0.8 mm and the amount of fill to be filled was regulated as 58%, and the filling and moulding were carried after these requirements were met, then drying and following polishing as well as packaging were carried out. The problems such as decentration and leakage did not occur during the preparation process.

Wherein, the semi-solid fill was prepared as follows:

20 kg of glucose syrup, 0.2 kg of vitamin B group, 1.0 kg of citric acid, and 0.02 kg of sucralose were fully dissolved with water, then sweet orange essence was added and stirred homogeneously; 0.1 kg of liposoluble lutein ester was added to 60 kg vegetable oil, stirred and added with 2.5 kg of modified starch until blended homogeneously; the substances obtained in the above two steps were processed with a homogenizing emulsifying device (such as colloid mill) to form a semi-fluid, which was then cooled to room temperature to obtain the fill.

EXAMPLE 7

Preparation of Filled Jelly Sweets Sample 3

In the present invention, the high content fill of filled jelly sweets was a semi-solid containing dietary fiber as nutritional ingredients.

30 kg of drinking water was added into a gelatin dissolving tank, heated to 70° C.-80° C., then 15 kg of ox bone gelatin with a gel strength of 180 Bloom, 15 kg of fish skin gelatin of 80 Bloom and 21 kg of glycerol were added, stirred until the gelatin was fully dissolved to obtain a transparent solution A; separately, 16 kg of white granulated sugar, 28 kg of sorbitol solution, 0.1 kg of gellan gum, 12 kg of modified starch were dissolved with water, then heated and decocted until a substance B having a solid content of 78Brix as measured with saccharimeter was obtained; the substances A and B were mixed homogeneously then vacuum degassed, and kept at a temperature of 57° C.-62° C.; the above paste fill was added into a hopper, the thickness of sweet shell was regulated as 0.7 mm and the amount of fill to be filled was regulated as 70%, and the filling and moulding were carried after these requirements were met, then drying and following polishing as well as packaging were carried out. The problems such as decentration and leakage did not occur during the preparation process.

Wherein, the semi-solid fill was prepared as follows:

10 kg of glucose syrup, 12 kg of polydextrose, 0.03 kg of sucralose and 0.9 kg of citric acid were fully dissolved with water, then strawberry essence was added and stirred homogeneously; 0.1 kg of liposoluble vitamin E was added to 55 kg of sunflower seed oil, stirred and added with 2.5 kg of modified starch until blended homogeneously; the substances obtained in the above two steps were processed with a homogenizing emulsifying device (such as colloid mill) to form a homogeneous semi-fluid, which was then cooled to room temperature to obtain the fill.

EXAMPLE 8

Confirmatory Test of Chewiness of Filled Jelly Sweets

The filled jelly sweets Samples 1-3 obtained in above Examples 5-7 were subjected to organoleptic evaluation tests. In the organoleptic evaluation tests, 20 investigators tasted each sample and carried out evaluation in three terms, chewiness of filled jelly sweets, fullness, of fill and total quality feel, via scoring method according to the criteria in the following Table 3. In which, as for the chewiness of jelly sweets, tough or sticking on teeth is scored as very bad, soft and comfortable is scored as excellent; as for the fullness of fill, less content of fill and not having nutritive value is scored as very bad, high content of fill and having rich nutritive value is scored as excellent; as for the total quality feel, it refers to evaluation of taste, mouth feel and performance cost ratio of nutritive value.

TABLE 3

Criteria for organoleptic evaluation of filled jelly sweets (5 degrees)

| Item | Criterion | Score for the Corresponding Degree |
|---|---|---|
| Chewiness of filled jelly sweets | Very bad | 1 |
| | Poor | 2 |
| | Moderate | 3 |
| | Good | 4 |
| | Excellent | 5 |
| Fullness of fill | Very bad | 1 |
| | Poor | 2 |
| | moderate | 3 |
| | Good | 4 |
| | Excellent | 5 |
| Total quality feel | Very bad | 1 |
| | Poor | 2 |
| | moderate | 3 |
| | Good | 4 |
| | Excellent | 5 |

The results of the organoleptic evaluation tests are expressed in average values of scores for each sample as given by the 20 investigators and shown in Table 4, in which the comparison sample 3 (the fill contains DHA) and the comparison sample 4 are common filled jelly sweets commercially available

TABLE 4

Results of the organoleptic evaluation tests for filled jelly sweets

| Sample | Chewiness of filled jelly sweets | Fullness of fill | Total quality feel |
|---|---|---|---|
| Comparison sample 3 | 3.3 | 2.2 | 3.2 |
| Comparison sample 4 | 4.0 | 2.4 | 3.5 |
| Example 5 | 4.1 | 4.3 | 4.3 |
| Example 6 | 4.2 | 4.5 | 4.5 |
| Example 7 | 4.2 | 4.7 | 4.4 |

The comparison sample 3 and the comparison sample 4 are common filled jelly sweets in the prior art, which has less content of fill and low content of nutritional ingredients and their total quality feel is moderate due to the limitation of production process, while the filled jelly sweets Samples 1-3 as prepared in Examples 5-7 overcome the aforementioned drawbacks, have both rich nutrition and good taste, and show good results in all three investigation items

EXAMPLE 9

Investigation 1 for Stability of Filled Jelly Sweets (Temperature Resistance Test)

The chewable soft capsule Samples 1-2, the filled jelly sweet Samples 1-3, and the comparison Samples 1-4 with the same mass were separately packaged in the same containers and placed in a thermostat oven (temperature range was set as 38-44° C., the investigation was performed at each temperature for 12 hours, and temperature was elevated by 2° C. for each time), and the comparisons in terms of deformation, surface sticking conditions were carried out to determine the highest tolerable temperature and time for each product. In which, the condition without binding and deformation in product was scored as "V"; the condition with binding and slight deformation that could be easily restored was scored as "O"; and the condition with binding and serious deformation that could hardly be restored was scored as "X".

The results of temperature resistance test according to the temperature resistance test method are shown in Table 5.

TABLE 5

Results of temperature resistance test

|  | Samples | Results of temperature tolerance test | | | |
| --- | --- | --- | --- | --- | --- |
|  |  | 38° C. | 40° C. | 42° C. | 44° C. |
| Chewable soft capsules | Comparison sample 1 |  |  |  |  |
|  | Comparison sample 2 | V | V | V | O |
|  | Example 2 | V | V | O | X |
|  | Example 3 | V | V | V | O |
| Filled jelly sweets | Comparison sample 3 | V | V | V | V |
|  | Comparison sample 4 | O | X |  |  |
|  | Example 4 | V | O | X |  |
|  | Example 5 | V | V | V | V |
|  | Example 6 | V | V | V | O |
|  | Example 7 | V | V | V | O |

The results in Table 5 show that the chewable soft capsules and the filled jelly sweets of the present invention are obviously superior to the current commercial available chewable soft capsules and filled jelly sweets in term of temperature resistance.

EXAMPLE 10

Investigation 2 for Stability of Filled Jelly Sweets (Shelf Life Test)

The chewable soft capsule Samples 1-2, the filled jelly sweet Samples 1-3, and the comparison Samples 1-4 with the same mass were separately packaged in the same containers and placed in a 37-38° C./RH75% constant temperature and humidity chamber, after initially measuring values at 0 point, measurements in terms of sensory as well as physicochemical and microbial indexes were performed periodically with an time interval of 15 days, and the investigation test would continue as long as the measured values meet their marked values and product standards so as to determine shelf life of product. Usually, when all the measured values on the 45$^{th}$ day meet the requirements, the corresponding shelf life would be at least 12 months; when all the measured values on the 90$^{th}$ day meet the requirements, the corresponding shelf life would be at least 24 months. When one of items of sensory, physiochemical and microbial indexes did not meet the requirements, a mark "-" was given; when two of these items did not meet the requirements, a mark "--" was given; and when all indexes meet the requirements, a mark "+" was given. The results are shown in Table 6.

TABLE 6

Results of shelf life test

|  | Samples | Results of shelf life test | | | | | |
| --- | --- | --- | --- | --- | --- | --- | --- |
|  |  | 15 d | 30 d | 45 d | 60 d | 75 d | 90 d |
| Chewable soft capsules | Comparison sample 1 | + | + | + | + | - | -- |
|  | Comparison sample 2 | + | + | + | + | -- |  |
|  | Example 2 | + | + | + | + | + | + |
|  | Example 3 | + | + | + | + | + | + |
| Filled jelly sweets | Comparison sample 3 | + | + | - | -- |  |  |
|  | Comparison sample 4 | + | + | - | -- |  |  |
|  | Example 5 | + | + | + | + | + | - |
|  | Example 6 | + | + | + | + | + | + |
|  | Example 7 | + | + | + | + | + | + |

The results in Table 6 showed that the chewable soft capsules and the filled jelly sweets of the present invention had greatly extended the shelf life in comparison with the comparison samples, which facilitates the storage and sale of product.

In general, the chewable soft capsules of the present invention have good chewiness and mouth feel, good temperature resistance, and long shelf life. In comparison with the existing products, the filled jelly sweets of the present invention have higher content of fill, better stability of product, have no problems of decentration, leakage, etc., and have good temperature resistance and longer shelf life.

Although the specific models for carrying out the invention are described in details, those skilled in the art would understand, according to the disclosed teachings, these details could be modified and changed, and all of these changes fall into the protection scope of the present invention. The protection scope of the present invention is given by the appended claims and any equivalents thereof.

What is claimed is:

1. A filled jelly sweet having a filling and a sweet shell that externally encapsulates the filling, in which the sweet shell is a chewable soft capsule shell comprising:
    a gelatin at an amount of 10%-50%;
    a water retention agent at an amount of 10%-40%;
    a thickening agent at an amount of 2%-20%;
    water at an amount of 6%-20%; and
    wherein the soft capsule shell is prepared via the following steps:
    1) dissolving gelatin by adding water into a tank for dissolving gelatin, elevating temperature to 70° C.-80° C. and then adding gelatin, water retention agent, stirring until the gelatin is fully dissolved to obtain a transparent solution A;
    2) decocting sugar by dissolving optional sweetening agent, optional water retention agent, thickening agent with water, then heating and decocting to reach a solid content of up to 70-80 Brix, then stopping heating to obtain a substance B;
    3) blending by mixing the transparent solution A and the substance B, stirring homogeneously then vacuum degassing to obtain a mixture gum solution, the temperature of the mixture gum solution being 55° C.-65° C.; and
    4) allowing the mixture gum solution obtained in step 3) to flow into a gum box, then flow from the gum box to a rubber wheel under the gum box, regulating to form a gum film with uniform thickness.

2. The filled jelly sweet according to claim 1, comprising one or more of the following items (1) to (5):
(1) said fill is a semi-solid or paste;
(2) the content of said fill in the filled jelly sweet is 15%-85%;
(3) said fill contains nutrient substance, the nutrient substance is one or more selected from the group consisting vitamins, minerals, amino acids, proteins, fatty acids, new resource food raw materials, animal extracts and plant extracts that are allowed to be added into the sweets according to national laws and regulations;
(4) said filled jelly sweet has a weight loss of ≤20% on drying; and
(5) said filled jelly sweet has a reducing sugar content of ≥10% expressed in glucose.

3. The filled jelly sweet according to claim 1, wherein the content of said fill in the filled jelly sweet is 20%-85%.

4. The filled jelly sweet according to claim 1, wherein the content of said fill in the filled jelly sweet is 25%-85%.

5. The filled jelly sweet according to claim 1, wherein the content of said fill in the filled jelly sweet is 30%-85%.

6. The filled jelly sweet according to claim 1, wherein the content of said fill in the filled jelly sweet is 35%-85%.

7. The filled jelly sweet according to claim 1, wherein the content of said fill in the filled jelly sweet is 40%-85%.

8. The filled jelly sweet according to claim 1, wherein the content of said fill in the filled jelly sweet is 45%-85%.

9. The filled jelly sweet according to claim 1, wherein the content of said fill in the filled jelly sweet is 50%-80%.

10. The filled jelly sweet according to claim 1, wherein the content of said fill in the filled jelly sweet is 55%-85%.

11. The filled jelly sweet according to claim 1, wherein the content of said fill in the filled jelly sweet is 55%-80%.

12. The filled jelly sweet according to claim 1, wherein the content of said fill in the filled jelly sweet is 60%-85%.

13. The filled jelly sweet according to claim 1, wherein the content of said fill in the filled jelly sweet is 60%-80%.

14. The filled jelly sweet according to claim 1, wherein the content of said fill in the filled jelly sweet is 15%-65%.

15. The filled jelly sweet according to claim 1, wherein the content of said fill in the filled jelly sweet is 20%-65%.

16. The filled jelly sweet according to claim 1, wherein the content of said fill in the filled jelly sweet is 25%-65%.

17. The filled jelly sweet according to claim 1, wherein the content of said fill in the filled jelly sweet is 30%-65%.

18. The filled jelly sweet according to claim 1, wherein the content of said fill in the filled jelly sweet is 35%-65%.

19. The filled jelly sweet according to claim 1, wherein the content of said fill in the filled jelly sweet is 40%-65%.

20. The filled jelly sweet according to claim 1, wherein the content of said fill in the filled jelly sweet is 45%-65%.

21. The filled jelly sweet according to claim 1, wherein the content of said fill in the filled jelly sweet is 55%-65%.

* * * * *